(12) United States Patent
Bishop

(10) Patent No.: US 8,511,662 B2
(45) Date of Patent: Aug. 20, 2013

(54) FIXTURE FOR BENCH ASSEMBLY

(75) Inventor: Jeffrey C Bishop, Derby (GB)

(73) Assignee: Rolls-Royce PLC, London (GB)

( * ) Notice: Subject to any disclaimer, the term of this patent is extended or adjusted under 35 U.S.C. 154(b) by 385 days.

(21) Appl. No.: 12/749,837

(22) Filed: Mar. 30, 2010

(65) Prior Publication Data
US 2010/0270723 A1    Oct. 28, 2010

(30) Foreign Application Priority Data

Apr. 27, 2009    (GB) .................................... 0907092.1

(51) Int. Cl.
*B23Q 3/02*    (2006.01)

(52) U.S. Cl.
USPC ............................................ 269/95; 269/139

(58) Field of Classification Search
USPC ................ 269/90, 95, 96, 3, 6, 136, 138, 139
See application file for complete search history.

(56) References Cited

U.S. PATENT DOCUMENTS

| | | | | |
|---|---|---|---|---|
| 756,625 A * | 4/1904 | Haefele | .......................... | 434/403 |
| 2,834,221 A * | 5/1958 | Lassy | .............................. | 74/503 |
| 2,887,079 A | 5/1959 | Wilson | | |
| 3,612,537 A * | 10/1971 | Sato | .............................. | 273/156 |
| 3,827,162 A * | 8/1974 | Moeser | ......................... | 434/193 |
| 3,967,816 A * | 7/1976 | Ramsperger et al. | ............. | 269/9 |
| 4,070,075 A * | 1/1978 | Morgan | .................... | 312/249.13 |
| 4,283,055 A * | 8/1981 | Larsen | .......................... | 273/160 |
| 4,292,903 A * | 10/1981 | Hockema | ...................... | 108/146 |
| 4,390,578 A * | 6/1983 | Brooks | ........................... | 428/57 |
| 4,444,604 A * | 4/1984 | Martin | .......................... | 148/646 |
| 4,550,916 A * | 11/1985 | Ortiz | .............................. | 273/239 |
| 4,561,642 A * | 12/1985 | Parque | ......................... | 269/21 |
| 4,804,348 A * | 2/1989 | Bondi' | .......................... | 446/83 |
| 4,892,993 A | 1/1990 | Stol | | |
| 5,040,716 A | 8/1991 | Stetz | | |
| 5,065,989 A * | 11/1991 | Ho | .............................. | 269/139 |
| 5,131,637 A * | 7/1992 | Vaught | ........................ | 269/48.3 |

(Continued)

FOREIGN PATENT DOCUMENTS

DE    203 02 577 UI    6/2003
GB    1 438 023    6/1976

OTHER PUBLICATIONS

European Search Report dated Aug. 31, 2010 in corresponding European Patent Application No. 10 158 414.2.

(Continued)

*Primary Examiner* — Lee D Wilson
*Assistant Examiner* — Brent W Herring
(74) *Attorney, Agent, or Firm* — Oliff & Berridge, PLC (57) ABSTRACT

Provision of appropriate fixtures for locating components for fabrication, machining and installation purposes is important. Traditionally, solid fixtures have been utilized but these have limitations with regard to consistency of orientation particularly if the fixture is removed from a base support or workbench regularly. By providing sheet elements for sides 2, 3 and spacers 4, 5 a robust structure can be achieved when these sheet elements are secured at corners to a base support 8 and to each other at top portions. In such circumstances the fixture 1 can present location plates 41, 42 upon a locator 43. The locator 43 comprises cross secured plates which extend through at least one cross hole to limit movement of the locator upon which the location plates 41, 42 are presented to axial displacement. Rigidity of the fixture is further reinforced by integrating its structure with its base-plate support.

14 Claims, 5 Drawing Sheets

(56) References Cited

U.S. PATENT DOCUMENTS

| | | | | |
|---|---|---|---|---|
| 5,224,690 | A | * | 7/1993 | Vaught .................. 269/48.3 |
| 5,284,331 | A | * | 2/1994 | Lee et al. .................. 269/16 |
| 5,857,892 | A | * | 1/1999 | Leadbetter .............. 446/431 |
| 5,992,086 | A | * | 11/1999 | Cheng ...................... 43/57 |
| 6,145,212 | A | | 11/2000 | Geise et al. |
| 6,158,728 | A | * | 12/2000 | Smith ...................... 269/99 |
| 6,367,788 | B1 | * | 4/2002 | Babchuk .................. 269/45 |
| 7,798,478 | B2 | * | 9/2010 | Janson et al. .............. 269/6 |
| 2003/0034602 | A1 | * | 2/2003 | Kavanaugh .............. 269/45 |
| 2003/0071405 | A1 | * | 4/2003 | Miksovsky .............. 269/95 |
| 2006/0054064 | A1 | * | 3/2006 | Miller et al. ............ 108/56.1 |
| 2006/0157536 | A1 | | 7/2006 | Wolf et al. |
| 2007/0011891 | A1 | | 1/2007 | Jaubert |

OTHER PUBLICATIONS

British Search Report issued in British Patent Application No. GB0907092.1, on Aug. 27, 2009.

* cited by examiner

FIXTURE FOR BENCH ASSEMBLY

BACKGROUND

The present invention relates to fixtures and more particularly to fixtures utilised for bench assembly in which components such as pipes, ducting or other parts are presented to allow typically manual assembly or further manufacturing processes to be performed such as welding.

It will be understood that it is often necessary in component assembly to provide a fixture that can consistently and repeatedly present components typically in precise relative orientation to allow, for example, machining and/or joining. Generally a prior fixture comprises a solid structure attached to a base-plate at an angle. In such circumstances a metal plate which is typically circular can be presented such that a flange or other mounting feature of a component can be secured to the plate and in such circumstances all movement other than locally axial is restricted. By movement of an elongate member secured to the plate it will be understood displacement of the plate, and so axial displacement of the component such as a flange secured thereto can be easily achieved. Through use of an appropriate measurement gauge accurate positioning of the plate within a tolerance range can be achieved. It will be understood that such gauges are generally of a "go/no go" type indicating whether location is acceptable rather than to give a measurement of the exact location of the plate and therefore the flange or other element upon which the component is secured. It will be understood that the effectiveness in such circumstances of the plate with regard to holding the flange in location depends on the accuracy of manufacture of the flange. If the flange is at its maximum tolerance then the fit will not be as accurate on the plate and therefore there will be scope for movement of the flange and therefore the associated component or pipe.

It will also be understood that such a prior approach does not provide a rigid and consistent reference point for assembly and processing purposes. It is normally necessary to remove the fixture and base-plate from the workbench periodically and in such circumstances it is not possible to guarantee that relocation or placing of the fixture on the workbench will replicate identical gravitational support each time and thus, the base-plate will be subjected to varying degrees of distortion. It will be understood that such distortion will adversely affect the spatial relativity of reference points contained within the fixture. Furthermore, the fixture is generally a solid structure such that if a sufficient force is applied to the upper end of the fixture this could cause the structure to move therefore again undermining any surety with regard to the reference point and correct positioning of the component in operation. The movement may temporarily or permanently distort the fixture.

A further disadvantage with regard to prior fixture arrangements is that the process for locking the plate to the flange does not guarantee that once located the pipe cannot move in the axial direction. It will be understood that in view of the way that the fixture is constructed there may be a tolerance with respect to the height of the pillar and with respect to the angle at which the pillar is attached to the base-plate. Each of these tolerance levels may affect the consistency of location with regard to datum reference positions relative to other parts of the workbench.

In view of the above it will be appreciated that achieving a rigid fixture in terms of reference point consistency is difficult. Previous approaches did not guarantee the positioning of the reference point in the centre of the flange and therefore it is difficult to provide consistency with regard to correct location every time with a component in the fixture. It is possible to remove the fixture from the workbench and such removal could cause variations between each installation of the fixture on a workbench as already cited above. Additionally, when working under load, distortion of the fixture may cause variations in location and it is difficult to provide sufficient restriction of movements in the end of the pipe through the flange to maintain highly consistent positioning of that pipe through the flange.

In accordance with aspects of the present invention there is provided a fixture for bench assembly, the fixture comprising spaced sheet sides secured at each corner in a fixed space relationship to a base support and at a top part with a spacer wall at each end in a square relationship, each spacer wall also secured to the base support at corners and at a top part to the sheet sides, a location plate secured to the fixture at one side and having a cross-shaped hole for a locator, the fixture at the other side having a hole for the locator whereby the locator extends between the cross-shaped hole and the hole to provide a constant position for the locator and/or location plate in the fixture.

Typically, the location plate is a flange upon which a component can be secured. Possibly, the locator provides an entrant fixture for a component such as a pipe.

Typically, the fixture includes two location plates at each side of the fixture. Typically, the location plates are of different configurations. Possibly, the fixture includes different positions for fixings to the location plates in terms of spacing, position, size or otherwise to ensure the correct location plate is positioned upon the correct side of the fixture.

Generally, the fixture includes a top plate secured between the sheet sides and the spacer walls.

Possibly, the base support comprises spaced top and bottom surfaces, the sheet sides and/or spacer walls having a tongue element to pass through a slot in the top surface to allow securing of the sheet sides and/or spacer walls to both surfaces.

Generally, the locator comprises crossed interlocked plates. Typically, the hole at the other side of the fixture is a second cross-shaped hole to receive the locator.

Generally, the sheet sides and/or spacer walls are secured together and to the base surface through dowels extending through slots respectively and secured by twisting the dowels into misalignment after extending through the slots.

Typically, the sides and/or spacer walls have cut out sections. Generally the location plate includes an orientation feature to ensure correct location of the location plate upon the side of the fixture. Possibly the location feature is a hook to inhibit inappropriate attachment of the location plate and/or a component in use to the location plate.

Typically the locator is secured by dowels extending through slots in the location plate and secured by twisting the dowel into misalignment for the section extending through the slot.

Generally, the locator is arranged to have four points of contact with each respective location plate to provide a pair of four location points at spaced locations either side of the fixture.

Possibly, an upper part of the locator includes a lock. Possibly the lock comprises a 'shark fin' extending into a slot to limit axial movement of the shark fin and therefore the locator. Possibly the slot has a latch lock to engage the shark fin to further inhibit axial movement in the slot by the shark fin.

Aspects of the present invention will now be described by way of example only with reference to the accompanying drawings in which.

As indicated above accurate presentation of components, such as ducting and piping, is important to ensure that machining, assembly and joining processes and fabrication including assembly processes are appropriately performed every time. Thus, consistent datum reference points are required. Conventionally solid and robust fixtures have been used. These prior fixtures can vary when removed from a work-bench or as a result of loading provided by the component in use. Thus, consistency of positioning may not be guaranteed particularly under applied load. Ideally there should be sufficient restriction of the movement of the component such as the end of a pipe in order to maintain the datum position consistently over operational processes.

In accordance with aspects of the present invention a fixture is created by sheet elements secured together in order to provide an intrinsically robust fixture that is further reinforced by being fully integrated with its associated base-plate. Essentially a square engagement configuration with the base-plate is provided through spaced side sheets with spacer walls between them at either end. In such circumstances upon the top surface of a base-plate the side sheets and wall spacers are secured at each corner. By fixing these side sheets and wall spacers at their corners as well as similar fixtures at the top of these elements a rigid structure is created which has a decreased capability for side twist as will be described later with regard to FIG. 5. As indicated the side sheets are joined together through wall spacers at a position close to the base support and towards the top part of these components to reduce flexibility. As will be described later securing of the sheet sides and wall spacers is preferably through twist dowels in which a dowel is presented through a slot and then a portion of the dowel twisted out of alignment to retain position.

Figure 1:
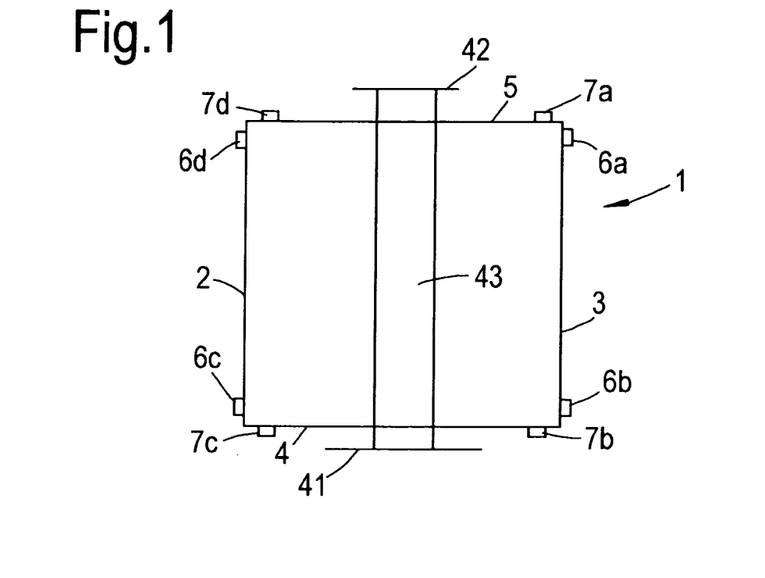
FIG. 1 is a schematic plan view of a fixture in accordance with aspects of the present invention.
Figure 2:
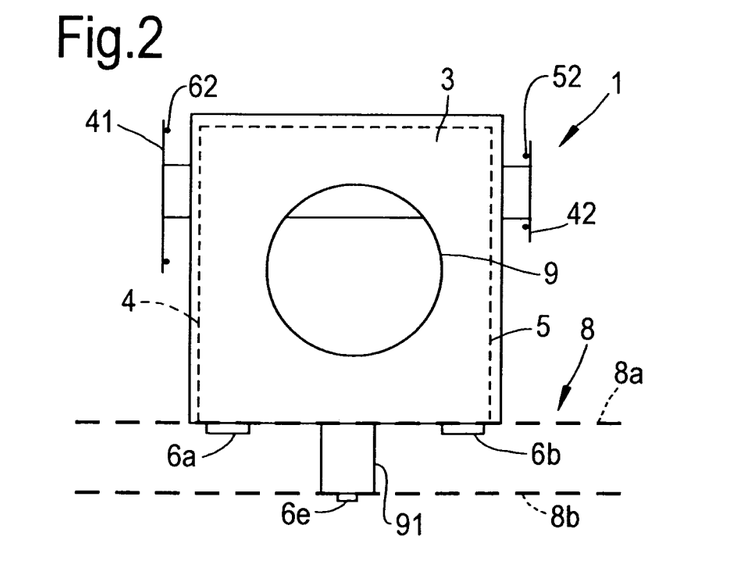
FIG. 2 is a schematic side view of the fixture as depicted in FIG. 1.

FIG. 1 and FIG. 2 provide schematic illustrations of a fixture in accordance with aspects of the present invention. The fixture 1 comprises sheet sides 2, 3 along with wall spacers 4, 5 or other elements to allow the sides 2, 3 and spacers 4, 5 to be secured through fastenings 6, 7 at the corners. It will be appreciated that these fasteners 6, 7 are secured to the top face of the base-plate 8 and by having fasteners substantially perpendicular to each other a robust and rigid structure is created.

Generally upper portions of the sheet sides 2, 3 and spacers 4, 5 are also secured in a perpendicular relationship through appropriate mechanisms. Normally, such mechanisms comprise a dowel which passes through a slot in a surface and a portion of the dowel is then twisted out of alignment to prevent return.

In order to reduce weight whilst maintaining structural integrity typically components such as the sheet sides 3, 4 as well as spacers 4, 5 will have cut out sections 9.

Figure 3A:
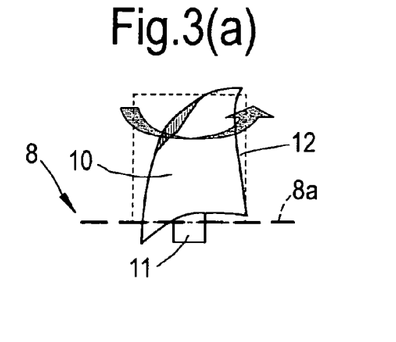
FIG. 3 is a schematic illustration of twisting effects upon a sheet of material.

As indicated above a fixture in accordance with aspects of the present invention is typically formed from sheet materials to provide greater resilience in comparison with solid structures of suitably acceptable weight and operability. The sheet walls defined by the sides 2, 3 and spacers 4, 5 provide strength as separate entities. As illustrated in FIG. 3a a sheet element 10 when secured by a single peg 11 is subject to distortion from an original shape shown by the broken lines to a twisted shape shown by solid lines 12. Clearly such distortion will be unacceptable for a supposedly stable fixture. However by providing four separate components, that is to say sheet sides 2, 3 and spacers 4, 5 which are connected substantially perpendicular to each other in a square configuration at both bottom and top then resistance to such distortion is greatly increased.

Figure 3B:
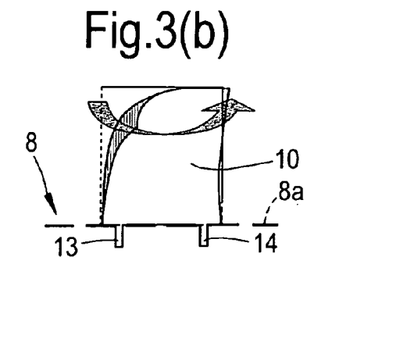

As illustrated in FIG. 3b by providing dowels 13, 14 which are twisted to provide robust association with a top sheet of a base-plate 8 then limited or no distortion occurs. The dowels 13, 14 must be located towards the corners of the sheet side 10 to provide such robust location. Similar perpendicular fixings will be provided towards upper corners of the top sheet 10 in order to create a box structure which is more robust.

Figure 4A:
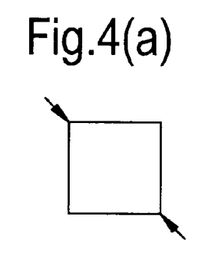
FIG. 4 is a schematic illustration of the effects of deformation upon corners of a sheet structure.
Figure 4B:
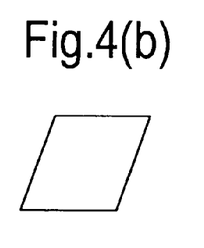

In summary if a force is applied to one side of a solid structure as illustrated in FIG. 3a it is conceivable that the structure will bend. However, by having four separate sheet components interconnected and joined to a base support as well as to each other at upper corners it will be understood that the force is more evenly distributed and less movement will occur in the fixture structure. A solid structure will be more resistant to deformation in a corner to corner situation as illustrated in FIG. 4a in comparison with a sheet structure as described above simply as a result of the mass of the solid structure between the corners. However by providing a physically larger and hollow sheet structure which is attached to the top and bottom sheets of a base-plate support at a perpendicular (square) orientation between the sheet sides and spacers it will be understood there is improved strength by such positioning as well as similar perpendicular orientated fixings at upper corners of the wall sheet parts. In such circumstances corner to corner distortion as will be expected and as illustrated by FIG. 4b is resisted by the base-plate support and upper corner fixings in accordance with aspects of the present invention. Clearly, these fixings must be robust and normally twisted dowel fixings are used in which a proportion of a dowel passes through a slot in an opposing sheet and this dowel is then twisted out of alignment to provide a robust fixing in use.

Sheets in accordance with aspects of the present invention will typically be formed from a metal which is manufactured and cut appropriately into sections. In such circumstances cut away sections to reduce weight can be removed provided mechanical strength is not compromised. The remaining metal in such circumstances will have slots cut into it or dowels as necessary to provide the fixing in accordance with aspects of the present invention. The cut away sections as indicated will reduce weight and therefore improve the ease of operability in terms of weight and positioning in use generally upon a support base in the form of a robust workbench.

Such reduced weight will further improve the feasibility of using fixings formed from sheet metals rather than conventional solid structures.

Figure 5:
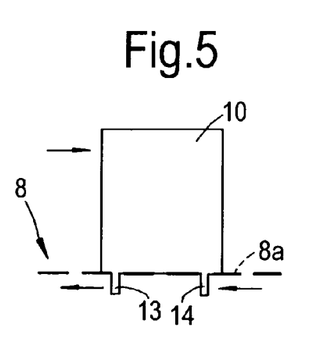
FIG. 5 illustrates one means of securing a side sheet to a base.

In view of the above it will be appreciated that a fixture structure in accordance with aspects of the present invention creates a box comprising generally upstanding sheet sides and spacer elements all associated together through appropriate fixings at corners. This box structure is robust but itself may be subject to distortion through loading unless care is taken with respect to operation. In order to improve structural rigidity in accordance with aspects of the present invention the fixture in the form of a structure is secured to a base support 8 which has spaced upper and lower surfaces to provide enhanced performance. It will be understood that prior arrangements may comprise sheets which are secured simply to an upper surface. Such a prior arrangement is illustrated in FIG. 5. Thus, the sheet 10 is secured to a base support 8 through dowels 13, 14 at corners of the sheet 10. If the sheet 10 is subject to a force in the direction of the arrowhead depicted it will be appreciated the reaction force is countered by the dowels 13, 14 twisted in appropriate slots in the base support 8. This reaction through the dowels 13, 14 may not be ideal.

Figure 6:
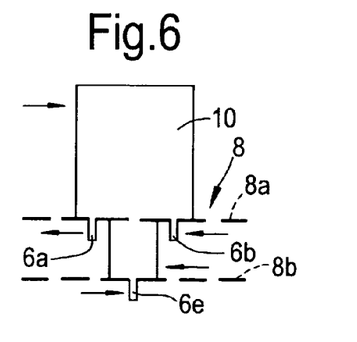
FIG. 6 illustrates a preferred means of securing a side sheet to a base support.

By providing an arrangement as depicted in FIG. 6 where a sheet 10 again is secured to base support 8 through dowels 6a, 6b, 6c but these dowels are secured respectively to an upper surface 8a and a lower surface 8b in the base support 8. Thus by attaching the sheet 10 and therefore a fixture in accordance with aspects of the present invention to both the top surface 8a and the bottom surface 8b reaction force is provided by both the top surface 8a in the form of a plate and the bottom surface 8b in the form of a plate giving greater resistance to movement to a distortive force or load in the direction of the arrowhead depicted. It will be understood that typically each side, that is to say sheet sides 2, 3 and spacers 4, 5 as depicted in FIG. 1 and FIG. 2 are secured to the surfaces 8a, 8b in order to further improve structural strength and thus reduce elastic flexibility in accordance with aspects of the present invention.

A common concern with regard to provision of an appropriate fixture in accordance with aspects of the present invention as described above is creating surety of the datum points for the fixture in use. In accordance with aspects of the present invention this is achieved by providing location plates as depicted in FIG. 1 and FIG. 2 at either side of the fixture structure created by the sheet sides 2, 3 and the spacers 4, 5. Although depicted with two location plates 41, 42 it will be understood that in some embodiments a single location plate may be provided. Generally the location plates 41, 42 abut an inner diameter of a cut out formed in the spacers 4, 5 such that fixings, again typically in the form of twisted dowels, can be used to locate the locating plates 41, 42. Generally four fixings are provided such that four fixings are created at each end of a locator 43. Typically, each location plate 41, 42 will be of a different configuration and typically a male and a female design may be used. Such designs are illustrated in FIG. 7 and FIG. 8.

Figure 7:
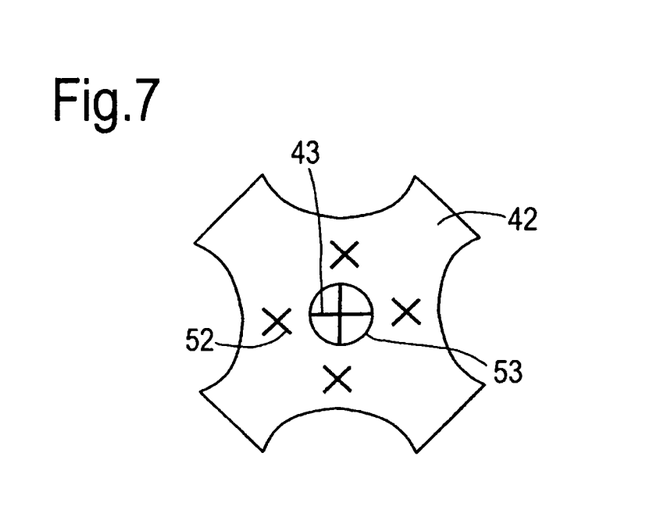
FIG. 7 provides a schematic illustration of a female location plate.
Figure 8:
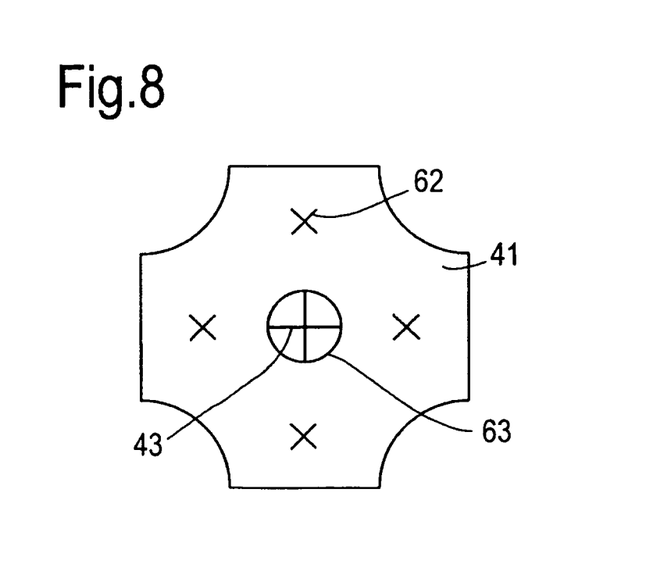
FIG. 8 is a schematic illustration of a male location plate.

In FIG. 7 a female configuration is illustrated in which a location plate 42 has fixings 52 to allow the location plate 42 to be secured in position. As can be seen the locator 43 extends across, but not through, an aperture 53 as will be described later to ensure consistent position. Typically in order to ensure correct orientation and prevent a male flange being fitted to a female location plate 42 a different fixing pattern will be used as well as sizing and locator differences. In such circumstances a component such as a pipe with a flange cannot be positioned the wrong way round upon a fixture in accordance with aspects of the present invention. Similarly with regard to a male location plate 41 in FIG. 8, fixings 62 are provided to allow the location plate 41 to be secured to the fixing structure comprising sheets secured at corners as described above. The location plate 41 includes an aperture 63 within which a locator 43 extends for consistent datum reference in accordance with aspects of the present invention.

Figure 9:
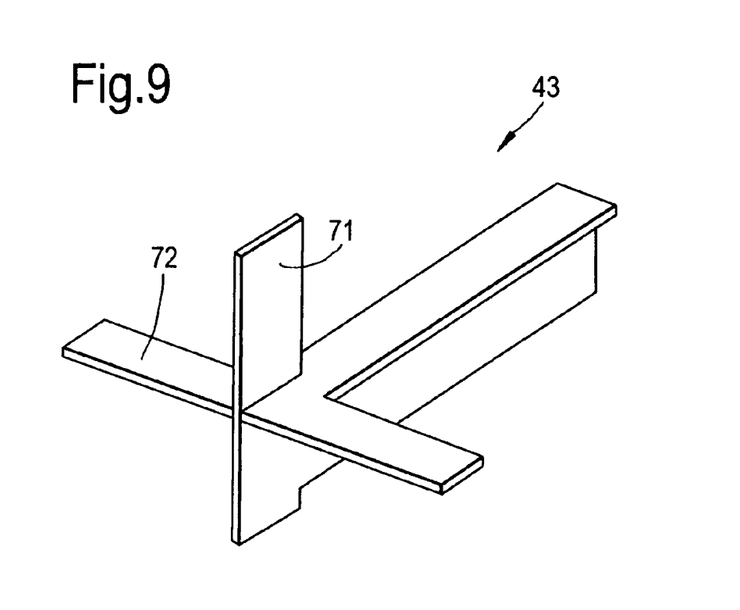
FIG. 9 is a schematic illustration of a locator in accordance with aspects of the present invention.
Figure 11:
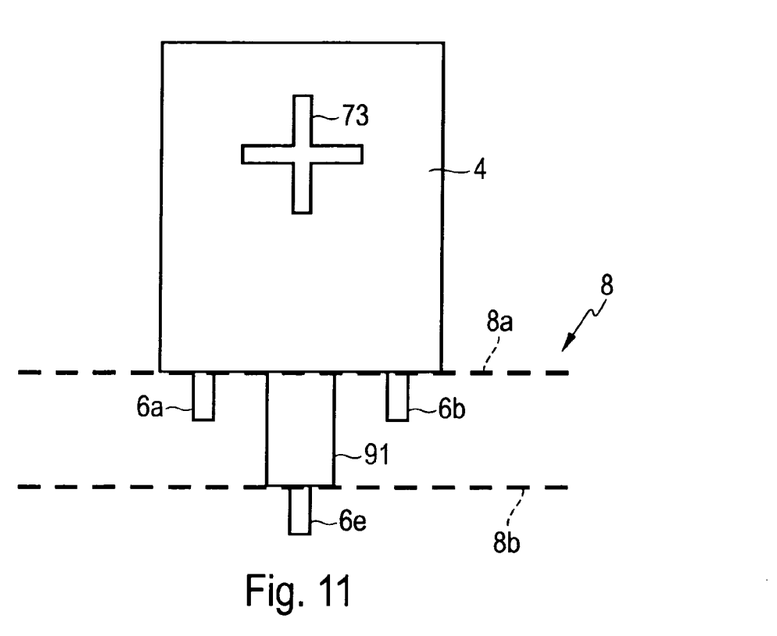
FIG. 11 illustrates an embodiment of the sheet structure having a generic representation of a cross-shaped hole.

It will be understood it is beneficial if a fixture can allow for some axial adjustment. The locator as described previously as locator 43 in earlier figures comprises two plates which are interlocked in a cross fashion. This configuration is shown schematically in FIG. 9. Reference nomenclature 43 for the locator has been maintained for consistency and clarity. In such circumstances as can be seen a vertical plate 71 is associated with a lateral plate 72 in a cross fashion as indicated above. The two plates 71, 72 in such circumstances create a pillar structure which can pass through a generic representation of a cross-shaped hole 73 in parts of the fixture, as shown in FIG. 11. Such a cross-shaped hole 73 will restrict the plates such that movement is in one direction only, that is to say an axial direction consistent with a pipe to which a flange is secured to a location plate as described above. It is by the interlocking of the two plates 71, 72 that respective movement of the plates relative to each other is restricted. In such circumstances respective parts 52, 62, can provide location points for dowels to enable the locator 43 to be secured to a location plates 42, 41 and so locate the inner diameter of a flange in a fixture in accordance with aspects of the present invention.

Figure 12:
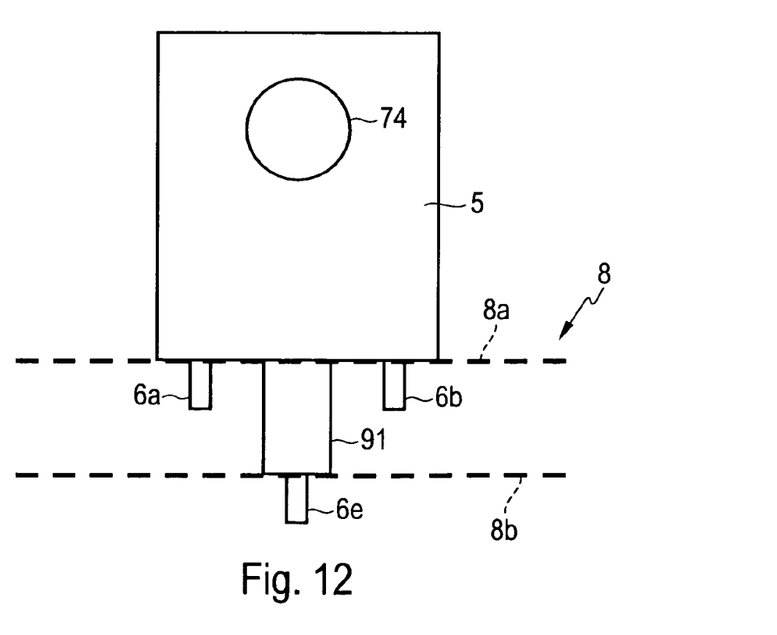
FIG. 12 illustrates an embodiment of the sheet structure having a generic representation of a simple round hole.

In the above circumstances it will be understood that by providing a cross-shaped hole 73 in the fixture and arranging that the locator 43 is presented between those spaced holes in the rigid structure of the fixture that movement is limited to an axial direction. The cross plates 71, 72 will enter the cross-shaped hole 73 and so in a preferred embodiment will have eight points of contact to limit location and movement of the locator 43 and therefore the associated flange. It may be possible in some circumstances to provide a single cross-shaped hole 73 and dependent upon that hole for limitation of axial movement through a generic representation of a simple round hole 74, as shown in FIG. 12, in the opposite side of the fixture but clearly such an approach is less robust and the locator must remain within the round hole 74 for presentation to the constriction provided by the cross-shaped hole 73 at the other end of the fixture.

Figure 10:
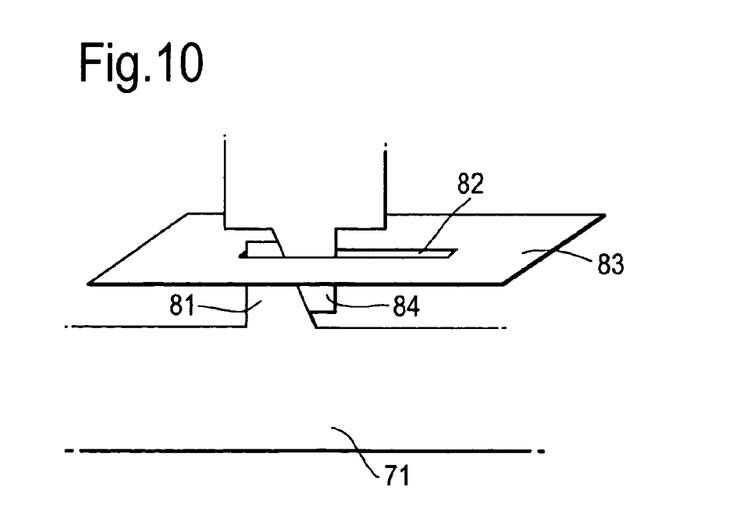
FIG. 10 illustrates a lock arrangement for a locator in accordance with aspects of the present invention.

It will be appreciated that positioning of the locator and therefore the location plate associated with the locator is important such that the flange to which the pipe is secured can be moved in an axial direction consistent with the direction of the pipe. A lock associated with the locator 43 can be utilised for such positioning. The lock comprises a shark fin element 81 which extends into a slot 82. The shark fin element 81 is an extension of a vertical plate in the locator 43 whilst the slot is formed in a lateral plate 83 possibly a top wall of the box structure depicted in FIG. 2. The slot limits the range of movement of the shark fin element 81 and therefore lateral displacement in the axial direction of the associated locator. Furthermore generally a lock mechanism 84 will extend downwardly through the slot 82 to engage the shark fin element 81. In such circumstances when the lock 84 is removed it will be appreciated that the locator can be moved, that is to say retracted away from the pipe for easy positioning. The arrangement depends upon the natural springiness of the material from which the lock 84 is formed. This material is typically titanium. When the lock 84 enters the slot 82 it will be appreciated that the shark fin element 81 engages an end of the slot 82 and cannot move. In such circumstances when the lock mechanism 84 is located in position, the locator associated with the shark fin element 81 cannot move in any direction including the lateral direction allowed by the holes at either side of the fixture in accordance with aspects of the present invention. Thus the locator and therefore the location plate for a flange to which a pipe is secured is robustly and consistently presented in the arrangement.

As indicated above a particular advantage with aspects of the present invention is that the base support can comprise a top surface or sheet and a bottom surface or sheet through which respective dowels 33, 34 (FIG. 6) extend. In FIG. 2 it will be noted that dowels 6*a*, 6*b* engage an upper surface of the base support whilst a dowel 6*e* through a tongue engages a lower surface or plate 8*b* at a spaced position on the upper surface 8. As indicated with regard to FIG. 6 such an arrangement provides further rigidity with regard to positioning the fixture in use. An additional benefit with regard to provision of such spaced upper and lower surfaces is that slots in different locations can be provided. The slots in different locations may allow a base-plate support to be operated in a number of configurations with different orientations of the same fixture or with different fixtures assembled as required to the base-plate. By such an approach different fixture configurations can be created and presented to an operator in terms of allowing positioning of components such as pipes through flanges associated with location plates in accordance with aspects of the present invention. By such an approach and by provision of a sufficiently large workbench, multiple base-plate processes can then be performed upon within the confines of the same workbench.

As indicated above provision of fixtures which have sufficient rigidity and robustness to allow consistent and accurate positioning of such components as pipes for fabrication and other processes is desirable. Creation of a rigid fixture formed from sheet material will be advantageous in terms of weight and operational flexibility. By providing a fixture which is secured and integrated with a rigid base-plate support generally at a top and bottom surface in the base-plate support spaced from each other greater rigidity of presentation of a fixture is achieved. Clearly, in order to take advantage of such greater rigidity a square configuration is provided in which sheet components, that is to say sheet sides 2, 3 and spacers 4, 5 are secured at corners to the base support as well as at top portions ensures appropriate rigidity particularly if a top plate is also included. Generally a tongue for a dowel tie bottom or lower surface plate is utilised. The tongue extends through a slot in the upper surface to allow the respective upper and lower surface fixing for improved performance in terms of rigidity and robustness of presentation as described above.

Further advantages of the present invention include provision of a locking mechanism which can lock the locator and therefore hold the location plate for a flange to which a component can be secured more robustly. For adjustment as indicated above generally the locator will be allowed to move laterally in an axial direction constrained by holes in the fixture. By creating a lock formed from a shark fin element entering a slot adjustability in an axial direction can be created then the adjustability locked by a lock mechanism limiting movement for the shark fin associated with the locator.

Particular advantages are provided by aspects of the present invention in that the fixture is generally formed from sheet metal materials. Thus, the fixture will be cheaper and faster to manufacture than with prior solid fixtures. Use of sheet materials will also create structural benefits in terms of resistance to deformation and overall the fixing structure will be lighter than prior arrangements.

Through use of bespoke location plates in the base-plate structure created by sheet size and spacers it will be understood that it will be easier to create assurance that the correct flange can only be secured to the correct location plate through appropriate orientation elements. These orientation elements as described above may comprise hooks or other features which prevent the wrong flange being secured to the location plate.

Aspects of the present invention have particular applicability with regard to securing pipes through an appropriate flange. By creation of a locator in the form of a cross plate pillar structure which is constrained to axial movement that is to say lateral movement through the cross hole it will be noted that adjustment for different situations and different capabilities will be readily achieved. The location plate can be readily substituted within the fixture for different sizes and shapes and types of device to be secured to the fixture such that modifications of the whole fixture for any shape of component can be readily achieved in comparison with prior arrangements.

It will be understood that fixtures in accordance with aspects of the present invention are made from sheets of material. These sheets can be accurately laser cut with slots and dowels to provide an accurate as well as robust structure.

Structures in accordance with aspects of the present invention could be utilised in order to appropriately position such elements as distillation columns and scrubbers in the chemical industry or for positioning of components in construction industries.

Modifications and alterations to aspects of the present invention will be appreciated by persons skilled in the technology. Thus, for example, rather than spacers provided solely at the ends of the fixture, an intermediate spacer with a hole for the locator could be provided within the fixture for greater structural integrity. Generally, as indicated above twisted dowels will be utilised for locating the sheet elements in accordance with aspects of the present invention but alternatively screw thread and nut associations could be utilised.

The invention claimed is:

1. A fixture for a bench assembly, the fixture comprising:
a base support;
a box structure comprising at least two sheet elements spaced from one another by at a pair of spacers and secured to the base support;
a location plate for engaging with an item to be assembled; and
a locator for locating the location plate in a fixed position relative to the spacers the locator having a cross-shaped profile,
wherein at least one of the spacers defines a cross-shaped hole, and the other of the spacers defines a further hole, the locator being locatable through the cross-shaped hole and the further hole, and
the spacers being secured between the sheet elements to fix the sheet elements in a predetermined position relative to the base support.

2. A fixture claimed in claim 1, wherein the location plate is a flange upon which a component can be secured.

3. A fixture as claimed in claim 1, wherein the locator provides an entrant fixture for a component.

4. A fixture as claimed in claim 1, wherein the fixture includes two location plates at each side of the fixture.

5. A fixture as claimed in claim 4, wherein the location plates are of different configurations.

6. A fixture as claimed in claim 1, wherein the fixture includes different positions for fixings to the location plates in terms of spacing, position, or size to ensure the correct location plate is positioned upon the correct side of the fixture.

7. A fixture as claimed in claim 1, wherein the fixture includes a top plate secured between the sheet elements and the spacer walls, the top plate defining a slot.

8. A fixture as claimed in claim 1, wherein the base support comprises spaced top and bottom surfaces, the top surface defining a slot, and the sheet elements and spacer walls having a tongue element to pass through the slot in the top surface to allow securing of the sheet elements and/or spacer walls to both surfaces.

9. A fixture as claimed in claim 1, wherein the locator comprises crossed interlocked plates.

10. A fixture as claimed in claim 1, wherein the hole at the other side of the fixture is a second cross-shaped hole to receive the locator.

11. A fixture as claimed in claim 1, wherein the locator is arranged to have four points of contact with each respective location plate to provide a pair of four location points at spaced locations either side of the fixture.

12. A fixture as claimed in claim 1, wherein an upper part of the locator includes a lock.

13. A fixture as claimed in claim 12, wherein the lock comprises a shark fin extending into the slot of the top plate to limit axial movement of the shark fin and therefore the locator.

14. A fixture as claimed in claim 13, wherein the slot of the top plate has a latch lock to engage the shark fin to further inhibit axial movement in the slot by the shark fin.

* * * * *